United States Patent
Langham et al.

(10) Patent No.: US 9,475,154 B2
(45) Date of Patent: Oct. 25, 2016

(54) HIGH BORON HARDFACING ELECTRODE

(71) Applicant: Lincoln Global, Inc., City of Industry, CA (US)

(72) Inventors: Daniel J Langham, Valley City, OH (US); Badri K Narayanan, Mayfield Heights, OH (US)

(73) Assignee: Lincoln Global, Inc., City of Industry, CA (US)

( * ) Notice: Subject to any disclaimer, the term of this patent is extended or adjusted under 35 U.S.C. 154(b) by 682 days.

(21) Appl. No.: 13/905,717

(22) Filed: May 30, 2013

(65) Prior Publication Data
US 2014/0353285 A1 Dec. 4, 2014

(51) Int. Cl.
| | |
|---|---|
| *B23K 35/30* | (2006.01) |
| *C23C 4/06* | (2016.01) |
| *B23K 25/00* | (2006.01) |
| *B23K 9/04* | (2006.01) |
| *B23K 35/02* | (2006.01) |
| *C22C 45/02* | (2006.01) |
| *B32B 15/01* | (2006.01) |
| *C22C 38/00* | (2006.01) |

(Continued)

(52) U.S. Cl.
CPC ............. *B23K 35/3086* (2013.01); *B23K 9/04* (2013.01); *B23K 25/005* (2013.01); *B23K 35/0261* (2013.01); *B23K 35/3053* (2013.01); *B23K 35/3093* (2013.01); *B32B 15/01* (2013.01); *B32B 15/011* (2013.01); *C22C 38/002* (2013.01); *C22C 38/02* (2013.01); *C22C 38/04* (2013.01); *C22C 38/34* (2013.01); *C22C 38/36* (2013.01); *C22C 38/38* (2013.01); *C22C 45/02* (2013.01); *C23C 4/06* (2013.01)

(58) Field of Classification Search
CPC .. C23C 4/06; B23K 26/005; B23K 35/0261; B23K 35/3053; B23K 35/3086; B23K 35/3093; B23K 9/04; B32B 15/01; B32B 15/011; C22C 38/002; C22C 38/02; C22C 38/04; C22C 38/36; C22C 38/38; C22C 45/02
See application file for complete search history.

(56) References Cited

U.S. PATENT DOCUMENTS

| | | | |
|---|---|---|---|
| 3,334,975 A | 8/1967 | Quass et al. | |
| 4,172,162 A * | 10/1979 | Danzey, Jr. | .......... B23K 35/327 148/24 |

(Continued)

FOREIGN PATENT DOCUMENTS

| | | |
|---|---|---|
| BG | 108688 | 10/2005 |
| CN | 1137433 | 12/1996 |

(Continued)

OTHER PUBLICATIONS

Berns, et al. "Microstructure of Fe—Cr—C Hardfacing Alloys with Additions of Nb, Ti and B", Metallography 20: 401-429 (1987).

(Continued)

*Primary Examiner* — Geoffrey S Evans
(74) *Attorney, Agent, or Firm* — Calfee, Halter & Griswold LLP (57) ABSTRACT

Electrodes for depositing hardfacing alloys containing boron, carbon, chromium, manganese, and silicon on the surface of metal components that are subjected to high thermal and mechanical stresses. The deposited hardfacing alloys have from about 2.5 to about 14.0 atomic percent boron and have a hardness on the Rockwell "C" scale of at least about 65 HRC in the first layer of the weld deposit.

20 Claims, 6 Drawing Sheets

(51) Int. Cl.
  *C22C 38/02* (2006.01)
  *C22C 38/04* (2006.01)
  *C22C 38/34* (2006.01)
  *C22C 38/36* (2006.01)
  *C22C 38/38* (2006.01)

(56) References Cited

U.S. PATENT DOCUMENTS

| | | | |
|---|---|---|---|
| 4,192,983 A * | 3/1980 | Paoletti | B23K 9/04 219/146.1 |
| 4,394,560 A | 7/1983 | Kishida et al. | |
| 4,396,822 A | 8/1983 | Kishida et al. | |
| 4,426,428 A | 1/1984 | Kammer et al. | |
| 4,430,122 A * | 2/1984 | Pauga | B23K 35/3093 148/23 |
| 4,738,389 A | 4/1988 | Moshier et al. | |
| 4,741,974 A | 5/1988 | Longo et al. | |
| 4,810,850 A | 3/1989 | Tenkula et al. | |
| 5,004,886 A | 4/1991 | Born et al. | |
| 5,093,148 A | 3/1992 | Christodoulou et al. | |
| 5,250,355 A | 10/1993 | Newman et al. | |
| 5,294,462 A | 3/1994 | Kaiser et al. | |
| 5,332,628 A | 7/1994 | Drossman | |
| 5,365,036 A | 11/1994 | Crockett et al. | |
| 5,755,298 A | 5/1998 | Langford, Jr. et al. | |
| 5,910,376 A | 6/1999 | Kelly | |
| 5,933,701 A | 8/1999 | Stucker et al. | |
| 6,103,997 A | 8/2000 | Pan | |
| 6,138,779 A | 10/2000 | Boyce | |
| 6,469,278 B1 | 10/2002 | Boyce | |
| 6,479,165 B2 | 11/2002 | Fischer et al. | |
| 6,565,678 B2 | 5/2003 | Fairchild et al. | |
| 6,603,090 B1 | 8/2003 | Schreiber et al. | |
| 6,784,402 B2 | 8/2004 | Kataoka et al. | |
| 6,888,088 B2 | 5/2005 | Bolton et al. | |
| 7,256,369 B2 | 8/2007 | Seitz | |
| 7,361,411 B2 | 4/2008 | Daemen | |
| 7,491,910 B2 | 2/2009 | Kapoor et al. | |
| 7,553,382 B2 | 6/2009 | Branagan et al. | |
| 7,553,563 B2 | 6/2009 | Grau et al. | |
| 7,569,286 B2 | 8/2009 | Daemen et al. | |
| 7,645,493 B2 | 1/2010 | Seitz | |
| 7,807,948 B2 | 10/2010 | Katiyar | |
| 7,884,305 B2 | 2/2011 | Soltis et al. | |
| 7,935,198 B2 | 5/2011 | Branagan et al. | |
| 7,939,182 B2 | 5/2011 | Cottignies et al. | |
| 8,097,095 B2 * | 1/2012 | Branagan | B22F 5/12 148/320 |
| 8,258,432 B2 | 9/2012 | Narayanan | |
| 8,322,466 B2 | 12/2012 | Bird | |
| 8,330,078 B2 | 12/2012 | Gerth et al. | |
| 8,419,868 B2 | 4/2013 | Lai | |
| 2004/0084421 A1 | 5/2004 | Bolton et al. | |
| 2006/0165552 A1 * | 7/2006 | Kapoor | B23K 35/0261 420/70 |
| 2007/0029295 A1 | 2/2007 | Branagan et al. | |
| 2007/0187369 A1 | 8/2007 | Menon et al. | |
| 2008/0241584 A1 * | 10/2008 | Daemen | B23K 9/04 428/684 |
| 2008/0251507 A1 | 10/2008 | Dolman | |
| 2010/0112374 A1 | 5/2010 | Knauf | |
| 2011/0114606 A1 | 5/2011 | Suzuki | |
| 2011/0315051 A1 | 12/2011 | Olsen | |
| 2012/0097658 A1 | 4/2012 | Wallin et al. | |
| 2012/0224992 A1 * | 9/2012 | Cheney | B23K 35/3053 420/114 |
| 2013/0045334 A1 | 2/2013 | Seals | |
| 2013/0052361 A1 * | 2/2013 | Croopnick | C22C 45/02 427/456 |
| 2013/0094900 A1 | 4/2013 | Folkmann et al. | |
| 2013/0260177 A1 * | 10/2013 | Wallin | B23K 35/3086 428/681 |

FOREIGN PATENT DOCUMENTS

| | | |
|---|---|---|
| CN | 1162513 | 10/1997 |
| CN | 1775454 | 5/2005 |
| CN | 1714987 | 1/2006 |
| CN | 1786271 | 6/2006 |
| CN | 1843681 | 10/2006 |
| CN | 1858293 | 11/2006 |
| CN | 100999042 | 7/2007 |
| CN | 101058130 | 10/2007 |
| CN | 101073861 | 11/2007 |
| CN | 101148008 | 3/2008 |
| CN | 101224527 | 7/2008 |
| CN | 101343721 | 1/2009 |
| CN | 101406994 | 4/2009 |
| CN | 101439448 | 5/2009 |
| CN | 101516567 | 8/2009 |
| CN | 101524789 | 9/2009 |
| CN | 101545088 | 9/2009 |
| CN | 101602152 | 12/2009 |
| CN | 101653875 | 2/2010 |
| CN | 101664862 | 3/2010 |
| CN | 101670501 | 3/2010 |
| CN | 101724805 | 6/2010 |
| CN | 102069317 | 5/2011 |
| CN | 102069322 | 5/2011 |
| CN | 102181814 | 9/2011 |
| CN | 102251205 | 11/2011 |
| CN | 102275051 | 12/2011 |
| CN | 102319968 | 1/2012 |
| CN | 102321861 | 1/2012 |
| CN | 102343487 | 2/2012 |
| CN | 102357750 | 2/2012 |
| CN | 102380716 | 3/2012 |
| CN | 102407411 | 4/2012 |
| CN | 102416534 | 4/2012 |
| CN | 102554494 | 7/2012 |
| CN | 102699495 | 10/2012 |
| CN | 102744532 | 10/2012 |
| CN | 102886620 | 1/2013 |
| CN | 102886621 | 1/2013 |
| EP | 527626 | 2/1993 |
| EP | 1209246 | 5/2002 |
| EP | 1872891 | 1/2008 |
| GB | 1224678 | 3/1971 |
| GB | 1319465 | 6/1973 |
| GB | 1350193 | 4/1974 |
| GB | 2250030 | 5/1992 |
| JP | 54-062145 | 5/1979 |
| JP | 58-141893 | 8/1983 |
| JP | 59-141396 | 8/1984 |
| JP | 60-221197 | 11/1985 |
| JP | 61-206589 | 9/1986 |
| JP | 62-259698 | 11/1987 |
| JP | 63-013693 | 1/1988 |
| JP | 64-083397 | 3/1989 |
| JP | 05-212587 | 8/1993 |
| JP | 2010-201506 | 9/2010 |
| KR | 20000023732 | 4/2000 |
| KR | 20030093452 | 12/2003 |
| RU | 2373039 | 11/2009 |
| RU | 2429957 | 9/2011 |
| WO | 2004/001089 | 12/2003 |
| WO | 2007/120205 | 10/2007 |
| WO | 2008/011448 | 1/2008 |
| WO | 2010/110873 | 9/2010 |

OTHER PUBLICATIONS

Fan, et al., "Microstructure change caused by (Cr,Fe)23C6 carbides in high chromium Fe—Cr—C hardfacing alloys", Science Direct, Surface & Coatings Technology, 201, 908-912 (2006).

Sapate, et al., "Erosive wear behaviour of weld hardfacing high chromium cast irons: effect of erodent particles", Tribology International 39, 206-212 (2006).

(56) References Cited

OTHER PUBLICATIONS

International Search Report and Written Opinion from PCT/IB2014/000882 mailed Dec. 15, 2014.

Notification Concerning Transmittal International Preliminary Report and Written Opinion of the International Searching Authority on Patentability from PCT/IB2014/000882 dated Dec. 1, 2015.

* cited by examiner

HIGH BORON HARDFACING ELECTRODE

The invention relates generally to the field of metal alloys and more particularly to an electrode for depositing a metal alloy on a workpiece, and even more particularly to an electrode for depositing a hardfacing metal alloy high in boron on the surface of a workpiece.

BACKGROUND OF THE INVENTION

Metal parts often fail their intended use due to wear, which causes them to lose dimension and functionality. "Hardfacing" is a technique which involves applying a layer of hard material to a substrate for the purpose of increasing the substrate's wear and corrosion resistance. The use of this technique has increased over the years as industry has come to recognize that substrates of softer, lower cost material can be hardfaced to have the same wear and corrosion resistance characteristics as more expensive substrates of a harder material. Hardfacing may be applied to a new part during production to increase its wear resistance, or it may be used to restore a worn-down surface. Hardfacing extends the service life of the workpiece and can save machine down time and production costs.

Hardfacing involves the deposition of a hard layer by welding or thermal spraying. Conventional weld hardfacing is accomplished by one of several welding techniques, including oxyfuel welding (OFW), gas tungsten arc welding (GTAW or TIG), hot wire GTAW, gas metal arc welding (GMAW), hot wire GMAW, shielded metal arc welding (SMAW), submerged arc welding (SAW), and flux-cored arc welding (FCAW). Plasma transferred arc (PTA) hardfacing and laser beam hardfacing can also be used. In general, a welding wire is deposited over the substrate surface to produce a weld deposit that is more wear resistant than the underlying substrate.

Hardfacing alloys are designed to provide improved wear resistance for a specific wear factor or a combination of wear factors. Abrasion performance of the deposited alloy is directly related to the amount of carbide forming metals, such as chromium, molybdenum, tungsten, vanadium, and iron, in combination with carbon. Wear resisting carbides are formed when one of these metals reacts with carbon, and the balance of the carbon remains in solution to form a semi-austenitic matrix in which the hard, wear resistant carbides are evenly distributed. As the ratio of the wear resistant carbides to the alloy matrix increases, abrasion resistance increases while at the same time its impact resistance decreases.

One type of hardfacing materials are alloys known as "chromium carbides." Their high abrasive resistance is derived from the presence in the microstructure of primary chromium carbides ($M_7C_3$) of the eutectic and/or hypereutectic type in a soft tough matrix. Because these alloys contain large amounts of chromium carbide, they are particularly good for severe abrasion resistance applications. However, chromium carbide alloys having a hardness on the Rockwell "C" hardness scale ("HRC") greater than 62 HRC have been difficult to achieve consistently. While the primary chromium carbides formed may themselves exhibit hardness values of around 63-65 HRC, the eutectic matrix, which is the material surrounding the primary carbides, exhibits hardness values in the range of 50 to 58 HRC. This makes it difficult to achieve a consistent average hardness measurement greater than 62 HRC in a first layer deposit of such chromium carbide alloys. While weld deposits with low levels of boron or niobium or both in the eutectic matrix may exhibit higher hardness measurements at points in the eutectic matrix, the hardness tends to be inconsistent across the weld bead.

While conventional chromium carbide alloys provide good wear resistance, the weld deposits produced from chromium carbide welding wires can produce a cross-checking pattern in the hard weld deposit surface. Unless hardfacing deposits with these types of microstructures cross-check to relieve the stresses, under-bead cracks may form and material will spall from the surface. While cross-check cracking that is uniformly distributed is desirable as it indicates a consistent microstructure, longitudinal cracking is detrimental as it contributes to the likelihood of under-bead cracking. Cross-check cracking may also trap abrasive material within the space formed by the cracks and allow the abrasive material to absorb some of the wear, adding to the total abrasive resistance of the deposit.

In view of the present state of hardfacing technology, it would be highly desirable and advantageous to provide an electrode for depositing a hardfacing alloy composition having a primary carbide eutectic microstructure of high abrasive resistance for use on the surface of metal components that are subjected to high thermal and mechanical stresses and that can consistently achieve a hardness value of at least about 65 HRC in the first layer of weld deposit. Such hardfacing alloys can produce the same amount of wear resistance using a thinner layer of the hardfacing alloy, or to extend further the service life of equipment by using the same amount of the hardfacing alloy.

SUMMARY OF THE INVENTION

The present invention pertains to electrodes that deposit an alloy on a workpiece, more particularly to an electrode that deposits a hardfacing alloy on the surface of a workpiece, and even more particularly to an electrode that deposits a hardfacing metal alloy high in boron on the surface of a workpiece. The hardfacing alloy deposited on the workpiece preferably includes a eutectic matrix having a fine grain size, small evenly dispersed carbides within the matrix, and a small amount of carbon in the matrix. The primary phase is a primary metal carbide of the type $M_7C_3$ that consists of chrome, boron, manganese, silicon, or any combination thereof.

The hardfacing alloy deposited by the electrode of the present invention is particularly useful as a metal surfacing on materials subjected to high thermal and mechanical stresses. The hardfacing alloy deposited by the electrode of the present invention has a unique combination of boron, chromium, carbon, manganese, and silicon. Generally, the hardfacing alloy formed from the electrode of the present invention includes, by atomic percent, at least about 2.5% boron, at least about 15.0% chromium; at least about 14.0% carbon, at least about 0.75% manganese, at least about 0.75% silicon, and the balance is iron.

The hardfacing alloy deposited by the electrode of the present invention has a hardness in the range of at least about 65 HRC in the first layer of weld deposit, and an ASTM G-65A wear result of less than 0.10 grams of material lost.

The hardfacing alloy can be deposited by any combination of various types of electrodes and various types of welding processes. For instance, the electrode of the present invention can be a self shielding electrode or a gas shielded electrode. When the electrode is a gas shielded electrode, the shielding gas is generally $CO_2$, Argon, or a $CO_2$-Argon mixture; however, other shielding gasses can be used. The electrode of the present invention can be a solid wire electrode, a flux coated electrode, a flux cored electrode, a metal filled electrode, etc. As such, the electrode of the present invention can be used in several different types of welding processes such as, but not limited to, neutral SAW flux with alloyed cored/solid electrode, alloyed SAW flux with alloyed cored/solid electrode, alloyed SAW flux with unalloyed cored/solid electrode, cored electrode with an alloyed/unalloyed sheath and alloyed/unalloyed fill. As can be appreciated, other types of electrodes and other types of welding processes can be used.

In one non-limiting example, the hardfacing alloy deposited by the electrode of the present invention includes, by atomic ("at") percent:

| Component | at % |
|---|---|
| B | 2.5%-14.0% |
| C | 14.0%-25.0% |
| Cr | 15.0%-26.0% |
| Mn | 0.75%-3.0% |
| Si | 0.75%-3.0% |
| Fe | Balance |

The hardfacing alloy set forth above may include additional alloying materials. In particular, it may include additional alloying materials that form mixed carbides with the chromium, such as, for example, at least one metal selected from the group consisting of niobium, molybdenum, and vanadium.

Nitrogen is also intentionally added to the hardfacing alloy to form nitrides with the boron or chromium, or both. Nitrogen also forms nitrides with niobium, molybdenum, and vanadium if one or more of these additional alloying materials are present. The nitrogen is preferably added as part of the welding process, e.g., through the use of a shielding gas, self shielding, or as part of an alloy with one or more of the metals included in the electrode. Preferably, the amount of nitrogen added ranges from about 60 to about 300 parts per million.

In one non-limiting embodiment, the composition of the weld deposited by an electrode of the present invention, in atomic percent, comprises 4.42% boron, 14.81% carbon, 16.69% chromium, 1.71% manganese, 1.01% silicon, and the balance is iron. The hardfacing alloy having such a composition deposited on ASTM A36 steel had an average hardness of 65 HRC as measured by a Rockwell C hardness tester and an average hardness value (HV) on the Vicker's Scale of 990.

In another non-limiting embodiment, the composition of the weld deposited by an electrode of the present invention, in atomic percent, comprises 4.08% boron, 17.67% carbon, 16.81% chromium, 1.66% manganese, 1.23% silicon, and the balance is iron. The hardfacing alloy having such a composition deposited on ASTM A36 steel had an average hardness of 67 HRC as measured by a Rockwell C hardness tester and an average hardness value (HV) on the Vicker's Scale of 966.

As can be appreciated, the hardfacing alloy deposited by an electrode of the present invention can have other compositions.

It is an object of the present invention to provide an electrode used to deposit an alloy on a workpiece.

It is another object of the present invention to provide an electrode used to deposit a hardfacing alloy for use on materials subjected to high thermal and mechanical stresses to increase thereby the life of such materials.

It is still another object of the present invention to provide an electrode used to deposit a hardfacing alloy high in boron on the surface of a workpiece that can consistently achieve a hardness value of at least about 65 HRC in the first layer of weld deposit.

These and other objects and advantages will become apparent from the following discussion of the invention.

BRIEF DESCRIPTION OF THE DRAWINGS

This invention may be more readily understood by reference to the following drawings wherein:

FIG. 5 shows a boxplot of the Vicker's hardness values (HV) measured in FIGS. 1 through 3. All data points are displayed in this chart. The interquartile range box and the upper and lower vertical "whiskers" indicate the measurements that fall within the normally distributed portion of the data. The stars indicate statistical outliers in the data.

DETAILED DESCRIPTION OF THE INVENTION

Referring to the following description of the invention for purposes of describing preferred embodiments of the invention only, and not for the purpose of limiting the invention, the electrode of the present invention is formulated to produce a hardfacing alloy composition on a metal surface. Such a hardfacing alloy has an average hardness of at least about 65 HRC in the welded state and/or the tempered state in a single layer deposit on a workpiece, such as a standard steel like ASTM A36, and an ASTM G65A wear result of less than 0.10 grams of material lost. The hardfacing electrode is particularly formulated to deposit a welding alloy having at least about 2.5 to about 14 atomic percent boron for use as a surfacing on metals subjected to high thermal and mechanical stresses utilizing a primary carbide eutectic matrix type microstructure.

The hardfacing alloy deposited by an electrode of the present invention has a composition, by atomic ("at") percent, as follows:

| Component | at % |
|---|---|
| B | 2.5%-14% |
| C | 14.0%-25.0% |

-continued

| Component | at % |
| --- | --- |
| Cr | 15.0%-26.0% |
| Mn | 0.75%-3.0% |
| Si | 0.75%-3.0% |
| Fe | Balance |

The hardfacing electrode set forth above may include additional alloying materials. In particular, it may include additional alloying materials that form mixed carbides with the chromium, such as, for example, at least one metal selected from the group consisting of niobium, molybdenum, and vanadium.

Nitrogen is also intentionally added to the hardfacing alloy to form nitrides with the boron or chromium, or both. Nitrogen also forms nitrides with niobium, molybdenum, and vanadium if one or more of these additional alloying materials are present. The nitrogen is preferably added as part of the welding process, e.g., through the use of a shielding gas, self shielding, or as part of an alloy with one or more of the metals included in the electrode. Preferably, the amount of nitrogen added ranges from about 60 to about 300 parts per million.

The chemical analysis of one non-limiting hardfacing alloy deposited by an electrode of the present invention, by atomic percent, is as follows:

TABLE 1

| B | 4.42 |
| --- | --- |
| C | 14.81 |
| Cr | 16.69 |
| Mn | 1.71 |
| Si | 1.01 |
| Fe | Balance |

The hardfacing alloy as welded on ASTM A36 steel having the composition set forth in Table 1 had an average hardness of 65 HRC as measured by a Rockwell C hardness tester and an average hardness value (HV) on the Vicker's Scale of 990.

The chemical analysis of another non-limiting hardfacing alloy deposited by an electrode of the present invention, by atomic percent, is as follows:

TABLE 2

| Component | at % |
| --- | --- |
| B | 4.08 |
| C | 17.67 |
| Cr | 16.81 |
| Mn | 1.66 |
| Si | 1.23 |
| Fe | Balance |

The hardfacing alloy as welded on ASTM A36 steel having the composition set forth in Table 2 had an average hardness of 67 HRC as measured by a Rockwell C hardness tester and an average hardness value (HV) on the Vicker's Scale of 966.

The believed functions of each of these components of the hardfacing alloy will be described; however, it will be appreciated that these are only the believed functions of the components, thus the components could have other or additional functions in the hardfacing alloy.

The boron (B) in the hardfacing alloy is believed to provide interstitial hardening in the matrix, and to strengthen the grain boundaries by accommodating mismatches due to incident lattice angles of neighboring grains with respect to the common grain boundary. The amount of boron included in the hardfacing alloys of the present invention should be enough to achieve the desired hardness levels. However, too much boron appears to interfere with the solidification of the hardfacing alloy and its ability to stick to the workpiece, and may lead to under-bead cracking. Generally, the preferred amount of boron is at least about 2.5 atomic percent of the hardfacing alloy up to about 14 atomic percent, more preferably from about 4.0 to about 13 atomic percent, and even more preferably from about 7.0 to about 12 atomic percent of the hardfacing alloy.

The carbon (C) in the hardfacing alloy is believed to influence the hardness level and strength of the hardfacing alloy. The amount of carbon included in the hardfacing alloys of the present invention should be enough to achieve the desired hardness levels by forming primary carbides of the $M_7C_3$ variety and forming secondary mixed metal carbides in the eutectic matrix. If there is too much carbon, the excess carbon either will not enter into solution and will not enter the weld pool, or it will precipitate out as graphite. Generally, the carbon content of the hardfacing alloy is at least about 14 atomic percent of the hardfacing alloy up to about 25 atomic percent, and more preferably from about 17 to about 22 atomic percent of the hardfacing alloy.

The chromium (Cr) in the hardfacing alloy is believed to improve the hardness and strength of the hardfacing alloy as well as to affect its corrosion resistance. The amount of chromium included in the hardfacing alloys of the present invention should be enough to achieve the desired hardness levels by forming primary carbides of the $M_7C_3$ variety. Generally, the chromium content of the hardfacing alloy is preferably at least about 15 atomic percent of the hardfacing alloy up to about 26 atomic percent, and more preferably from about 18 to about 21 atomic percent of the hardfacing alloy.

The manganese (Mn) in the hardfacing alloy is believed to improve hardness and toughness and to act as a deoxidizer by removing oxygen from the liquid weld metal. Manganese is also believed to act as a grain refiner and to stabilize cross-checking so that the cracks that form in the weld alloy are more consistent and evenly spaced. Too little manganese appears to affect the consistency of the spacing of the cracks. Generally, the preferred amount of manganese in the hardfacing alloy is at least about 0.75 atomic percent of the hardfacing alloy up to about 3.0 atomic percent.

The silicon (Si) is believed to act as a deoxidizer to improve corrosion resistance and to act as a grain refiner. Silicon also acts as a surface tension modifier to the molten weld pool. This allows for superior wetting of the puddle and provides excellent tie-in performance when welding. Too little silicon interferes with the wetting of the puddle, while too much silicon can make the weld pool too fluid. The preferred amount of silicon is at least about 0.75 atomic percent of the hardfacing alloy up to about 3.0 atomic percent.

The nitrogen (N) makes possible the formation of nitrides in the eutectic matrix which aids in achieving the desired hardness. The nitrides may include carbo-nitrides, boro-nitrides, boro-carbonitrides, etc., as well as any other similar combinations with other alloying materials that may be present. Too little nitrogen means that not enough nitrides will form to achieve the desired hardness, while too much nitrogen leads to the formation of voids in the weld deposit, thereby increasing its porosity. The nitrogen is preferably present in an amount ranging from about 60 to about 300 parts per million.

Other known metals can be included in the welds made by this invention, provided that they do not adversely affect the microstructure of the hardfacing alloy in any significant way. Such metals may include, for example, niobium, vanadium, and molybdenum, each of which can form mixed carbides with chrome to produce a microstructure with a higher average hardness. Generally, when present the amount of each of these metals is less than about 3.0 atomic percent.

Figure 1:
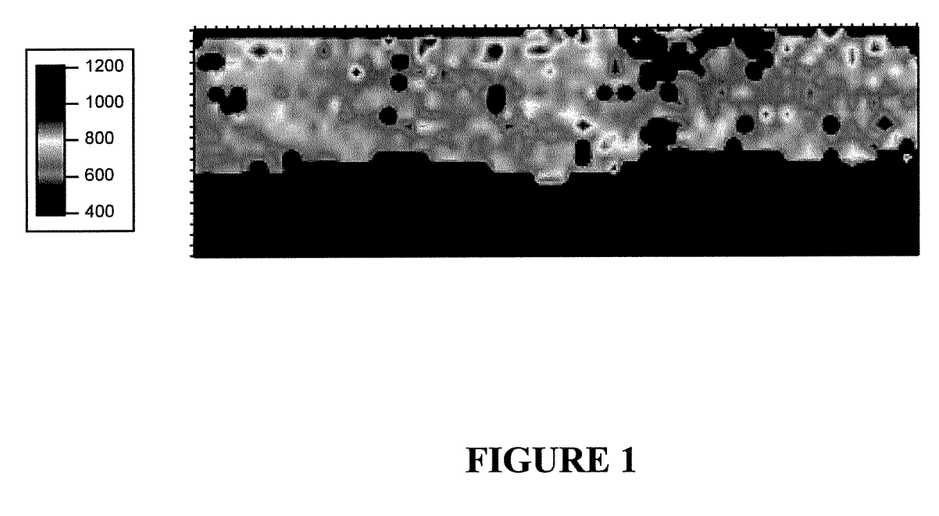
FIG. 1 is a microhardness map showing a cross section image of a weld pad of a traditional chromium carbide deposit containing no boron with hardness measurements on the Vicker's Hardness Scale (HV) taken every 500 microns.
Figure 2:
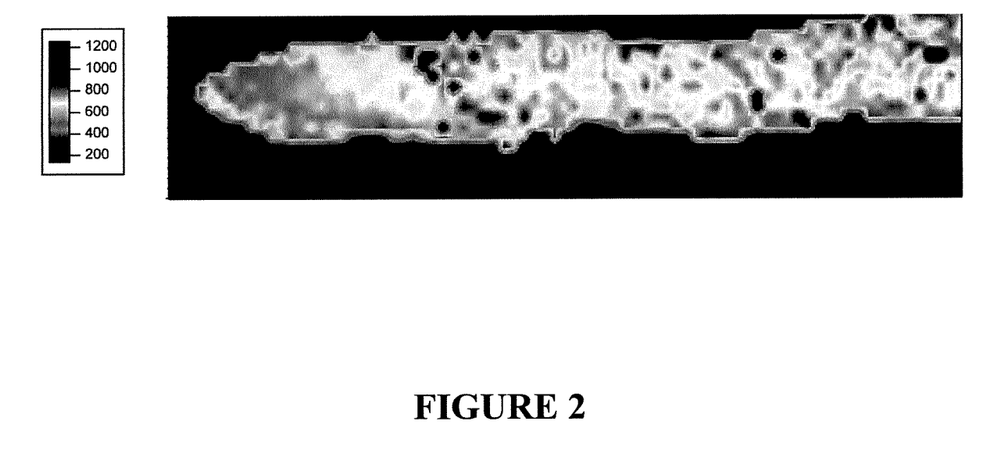
FIG. 2 is a microhardness map showing a cross section image of a weld pad having 0.71 atomic percent boron with hardness measurements on the Vicker's Hardness Scale (HV) taken every 500 microns.
Figure 3:
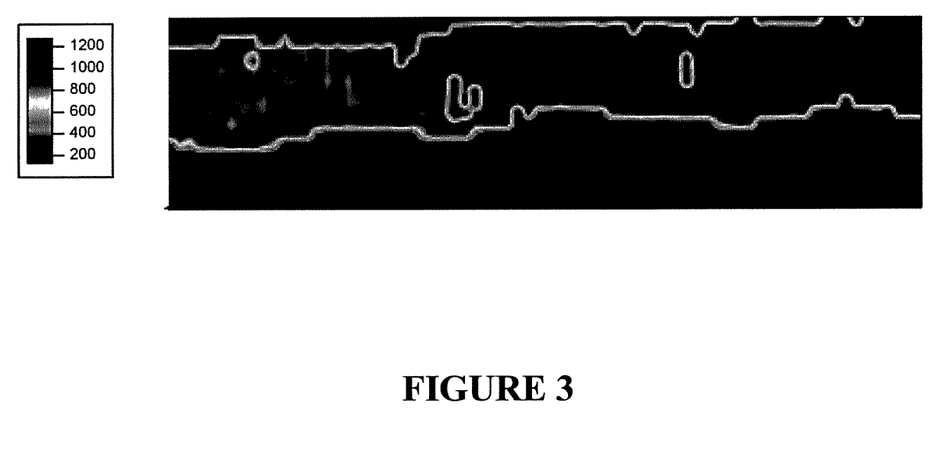
FIG. 3 is a microhardness map showing a cross section image of a weld pad having 4.08 atomic percent boron with hardness measurements on the Vicker's Hardness Scale (HV) taken every 500 microns.
Figure 4:
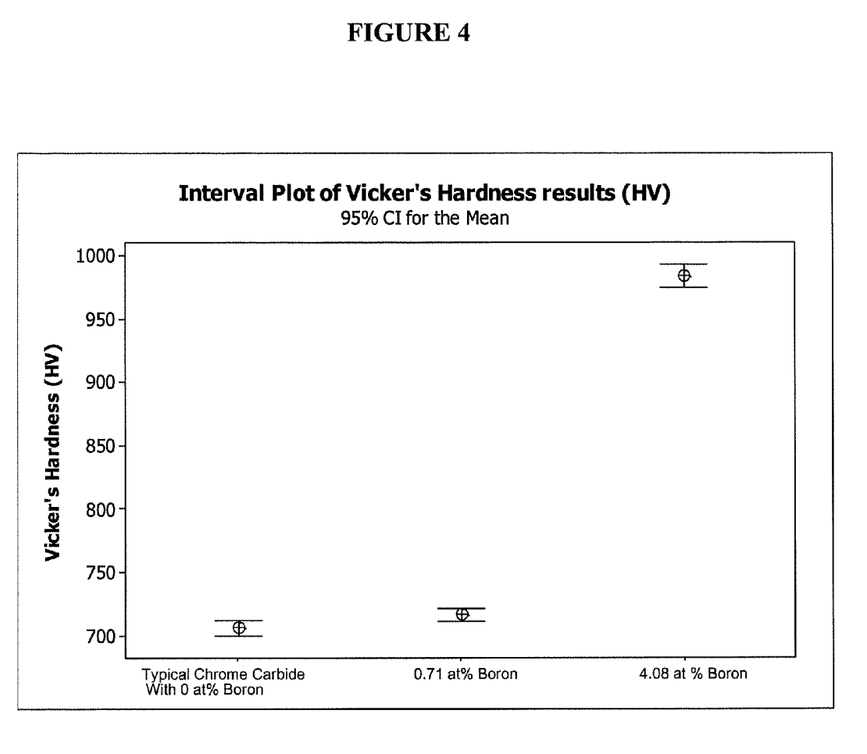
FIG. 4 shows an interval plot of the Vicker's hardness values (HV) measured from the microhardness maps shown in FIGS. 1 through 3. The 95% confidence interval for measured hardness values is displayed, i.e., a random sample from the population of hardness measurements has a 95% chance of falling within the ranges shown in FIG. 4.
Figure 5:
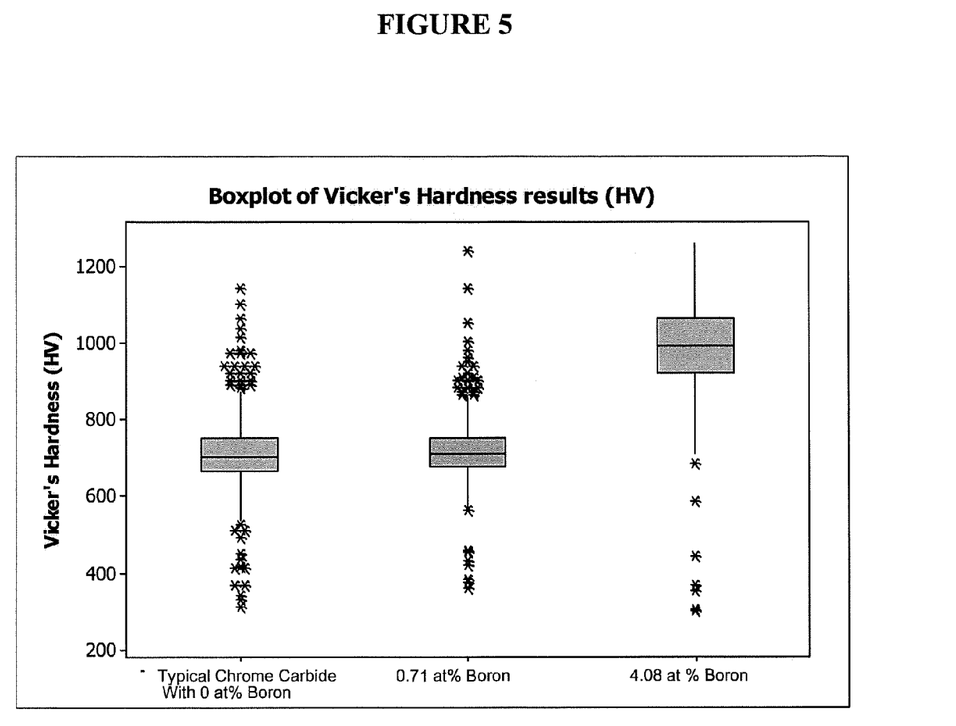
Figure 6:
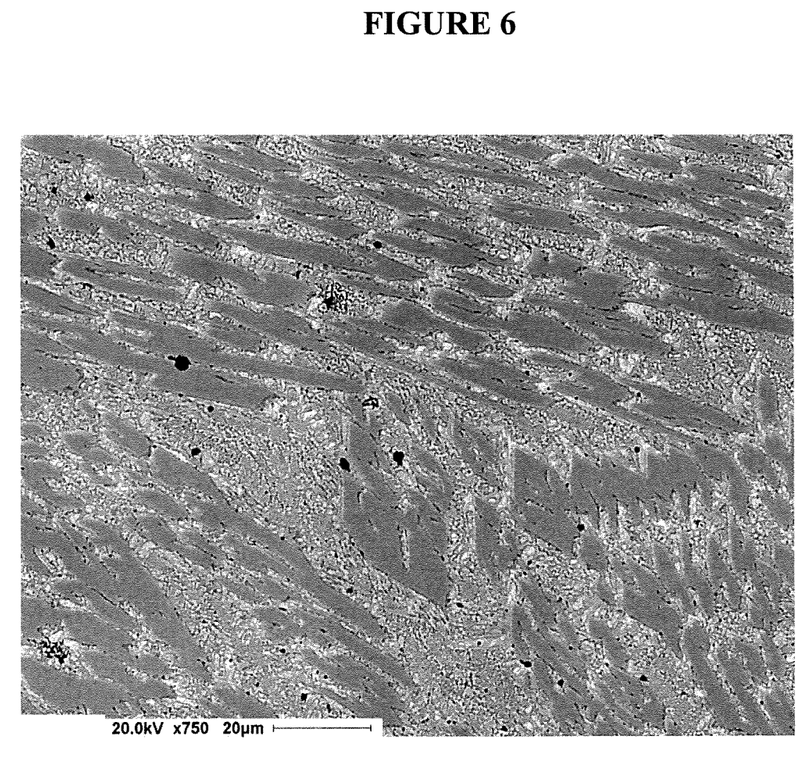
FIG. 6 shows the microstructure of one embodiment of the present invention in which the weld deposit has the composition set forth in Table 2 below.

Turning to the drawings, FIGS. 1-3 compare the hardness of a weld alloy having the composition shown in Table 2 above (FIG. 3) with a weld alloy of a traditional chromium carbide deposit containing no boron having the composition, in atomic percent, of 19.55% chromium, 18.38% carbon, 1.44% manganese, and 1.31% silicon (FIG. 1) and a weld alloy having the composition, in atomic percent, of 0.71% boron, 18.48% chromium, 16.78% carbon, 1.47% manganese, and 1.26% silicon (FIG. 2). The hardness map of FIG. 1 shows inconsistent hardness across the entire surface, as does the hardness map of FIG. 2. In contrast, the hardness map of FIG. 3 shows that the weld alloy with 4.08 atomic percent boron deposited by an electrode of the present invention has a higher, consistent hardness across the entire surface. The interval plot of FIG. 4 using the Vicker's hardness values measured from the microhardness maps of FIGS. 1-3 also illustrates the significant difference between the hardness intervals of the traditional chromium carbide weld deposit that does not contain any boron (FIG. 1) and the weld deposit containing 0.71 atomic percent boron (FIG. 2) with that of the weld deposit containing 4.08 atomic percent boron (FIG. 3). Similarly, the boxplot of FIG. 5 obtained by using the Vicker's hardness values measured from the microhardness maps of FIGS. 1-3 shows that the box and whiskers of the weld deposit having the composition shown in Table 2 above with 4.08 atomic percent boron has a higher hardness, and there are significantly fewer outliers in the data. This indicates that the weld deposit is uniform in microstructure and has a more consistent hardness. Finally, FIG. 6 illustrates the high fraction of primary carbides surrounded by distinct smaller structures forming the eutectic matrix in a weld deposit having the composition shown in Table 2 above.

The hardfacing electrode of the present invention is designed and formulated so that the desired hardfacing alloy composition can be deposited by any suitable welding means and methods such as, but not limited to, open arc, gas, or flux shielded. The electrode can be a self shielding electrode or it can be used in the presence of a shielding gas. The formed hardfacing alloy can be applied by directly depositing the metal particles on the workpiece or it can be spray coated on the workpiece. As such, the formed hardfacing alloy can be applied by a variety of processes such as, but not limited to, oxyfuel welding (OFW), gas tungsten arc welding (GTAW or TIG), hot wire GTAW, gas metal arc welding (GMAW), hot wire GMAW, shielded metal arc welding (SMAW), submerged arc welding (SAW), and flux-cored arc welding (FCAW). Plasma transferred arc (PTA) hardfacing and laser beam hardfacing can also be used.

The electrode that is used to form the desired hardfacing alloys is typically a cored wire electrode; however, it will be appreciated that the electrode could be a solid wire, a solid wire electrode that includes a flux coating, a flux cored electrode that includes a flux coating, etc. When the electrode is a coated or cored electrode, the coating or fill material in the core, or both, can include alloying agents, fluxing agents, slag agents, gas generating agents, etc. The electrode of the present invention can be a gas shielded electrode, a self shielded electrode, a strip material (using strip cladding, etc.), a manual electrode, a subarc electrode having an active flux, and the like.

In one non-limiting embodiment of the present invention, the electrode is a cored electrode that includes a metal sheath and a fill composition. The metal sheath is generally formed primarily from an iron alloy (e.g., carbon steel, low carbon steel, stainless steel, low alloy steel, etc.), but as can be appreciated, other types of metal sheaths can be used. When the electrode is a cored electrode, the fill composition typically constitutes at least about 1 weight percent of the total electrode weight, and not more than about 65 weight percent of the total electrode weight, typically about 10 to about 60 weight percent of the total electrode weight, more typically about 15 to about 55 weight percent of the total electrode weight, and even more typically about 25 to about 53 weight percent of the total electrode weight; however, it can be appreciated that other weight percentages can be used.

The fill composition can include one or more flux or slag components, or both; however, such components are not required. The flux and slag components, when included in the fill composition, can include one or more metal oxides (e.g., aluminum oxide, boron oxide, calcium oxide, chromium oxide, iron oxide, magnesium oxide, niobium oxide, potassium oxide, silicon dioxide, sodium oxide, tin oxide, titanium oxide, vanadium oxide, zirconium oxide, etc.), metal carbonates (e.g., calcium carbonate, magnesium carbonate, etc.), and/or metal fluorides (e.g., barium fluoride, bismuth fluoride, calcium fluoride, potassium fluoride, sodium fluoride, Teflon, etc.), other refractory silacious materials, and other elements and compounds (e.g., nitrogen, phosphorous, sulfur, etc.). These one or more flux or slag components, or both, can be used to improve arc stability, provide gas shielding, modify the slag characteristics, modify the composition of the hardfacing alloy, etc., and may be selected to closely match the desired composition or to obtain the desired properties of the deposited hardfacing alloy. When flux and/or slag components are included in the fill composition, these flux components generally constitute less than about 50 weight percent of the fill composition, typically less than about 30 weight percent of the fill composition, and even more typically about 0.05 to about 10 weight percent of the fill composition; however, it can be appreciated that other weight percentages can be used.

Incidentally, it is well known to skilled welding engineers that the composition of a weld produced by non-autogenous welding depends on a number of factors including the composition of the weld filler material used, the composition of the flux and/or shielding gas used, and the particular type of non-autogenous welding procedure used. In addition, it is also well known that the composition of the weld can be determined fairly precisely by suitably selecting and coordinating these variables. Accordingly, the inventive process is described herein in terms of the chemical composition of the weld ultimately produced, it being understood that a skilled welding engineer can easily achieve this chemical composition by suitable adjustment of the above variables in accordance with known techniques.

These and other modifications of the discussed embodiments, as well as other embodiments of the invention, can be made without departing from the spirit and scope of the invention. All such modifications are intended to be included within the scope of the invention, and it is to be distinctly understood that the foregoing descriptive matter is to be interpreted merely as illustrative of the present invention and not as a limitation thereof. Rather, the scope of the present invention is to be limited only by the following claims:

We claim:

1. An electrode for depositing a hardfacing alloy for application to a metal surface, the hardfacing alloy comprising by atomic percent of the electrode:
   from about 2.5 to about 14.0 percent boron;
   from about 15.0 to about 26.0 percent chromium;
   from about 14.0 to about 25.0 percent carbon;
   from about 0.75 to about 3.0 percent manganese;
   from about 0.75 to about 3.0 percent silicon;
   and the balance iron.

2. The hardfacing alloy deposited by the electrode of claim 1, wherein said electrode includes a metal sheath and a fill composition, said fill composition constituting about 10-60 weight percent of a total weight of said electrode.

3. The hardfacing alloy deposited by the electrode of claim 1 additionally comprising nitrogen.

4. The hardfacing alloy deposited by the electrode of claim 3, additionally comprising at least one element selected from the group consisting of niobium, molybdenum, and vanadium.

5. The hardfacing alloy deposited by the electrode of claim 1, wherein said boron comprises from about 4.0 to about 13 percent.

6. The hardfacing alloy deposited by the electrode of claim 5, wherein said boron comprises from about 7.0 to about 12 percent.

7. The hardfacing alloy deposited by the electrode of claim 5, wherein said boron comprises about 4.42 atomic percent and said alloy has a hardness on the Rockwell "C" scale of at least about 65 HRC.

8. The hardfacing alloy deposited by the electrode of claim 7, wherein said chromium comprises about 16.69 percent, said carbon comprises about 14.81 percent, said manganese comprises about 1.71 percent, and said silicon comprises about 1.01 percent.

9. The hardfacing alloy deposited by the electrode of claim 5, wherein said boron comprises about 4.08 percent and said alloy has a hardness on the Rockwell "C" scale of at least about 65 HRC.

10. The hardfacing alloy deposited by the electrode of claim 9, wherein said chromium comprises about 16.81 percent, said carbon comprises about 17.67 percent, said manganese comprises about 1.66 percent, and said silicon comprises about 1.23 percent.

11. A method of applying a hardfacing alloy on a metal surface comprising:
   a) selecting a workpiece metal; and,
   b) depositing a hardfacing alloy at least partially on said workpiece by use of an electrode, said hardfacing alloy comprising by atomic percent of the electrode:
   from about 2.5 to about 14.5 percent boron;
   from about 15.0 to about 26.0 percent chromium;
   from about 14.0 to about 25.0 percent carbon;
   from about 0.75 to about 3.0 percent manganese;
   from about 0.75 to about 3.0 percent silicon;
   and the balance iron.

12. The method as defined in claim 11, wherein said electrode includes a metal sheath and a fill composition, said fill composition constituting about 10-60 weight percent of said electrode.

13. The method as defined in claim 11 wherein said hardfacing alloy has a hardness on the Rockwell "C" scale of at least about 65 HRC.

14. The method as defined in claim 11, wherein said step of depositing said alloy is by a process selected from the group consisting of submerged arc welding, shielded metal arc welding, flux-cored arc welding, gas metal arc welding, hot wire gas metal arc welding, gas tungsten arc welding, hot wire gas tungsten arc welding, electroslag cladding, or spray cladding.

15. The method as defined in claim 14, wherein said hardfacing alloy includes from about 7.0 to about 12 percent boron.

16. The method as defined in claim 14, wherein said hardfacing alloy additionally includes nitrogen.

17. The method as defined in claim 14, wherein said hardfacing alloy includes from about 4.0 to about 13 percent boron.

18. The method as defined in claim 17, wherein said hardfacing alloy includes, in atomic percent, at least about 4.08 percent boron, at least about 16.81 percent chromium, at least about 17.67 percent carbon, at least about 1.66 percent manganese, and at least about 1.23 percent silicon.

19. The method as defined in claim 17, wherein said hardfacing alloy includes, in atomic percent, at least about 4.42 percent boron, at least about 16.69 percent chromium, at least about 14.81 percent carbon, at least about 1.71 percent manganese, and at least about 1.01 percent silicon.

20. The method as defined in claim 19, wherein said hardfacing alloy additionally includes at least one element selected from the group consisting of niobium, molybdenum, and vanadium.

* * * * *